US012583299B2

(12) United States Patent
Brown

(10) Patent No.: US 12,583,299 B2
(45) Date of Patent: Mar. 24, 2026

(54) COVER SECURING DEVICE, SYSTEM AND METHOD

(71) Applicant: Ronald W. Brown, Cincinnati, OH (US)

(72) Inventor: Ronald W. Brown, Cincinnati, OH (US)

( * ) Notice: Subject to any disclaimer, the term of this patent is extended or adjusted under 35 U.S.C. 154(b) by 271 days.

(21) Appl. No.: 18/347,005

(22) Filed: Jul. 5, 2023

(65) Prior Publication Data

US 2025/0010696 A1      Jan. 9, 2025

(51) Int. Cl.
*B60J 11/04* (2006.01)
*B60R 11/00* (2006.01)

(52) U.S. Cl.
CPC ....... *B60J 11/04* (2013.01); *B60R 2011/0059* (2013.01)

(58) Field of Classification Search
CPC ......... B60J 11/04; B60J 11/00; B60R 2011/59
USPC ........................................................ 150/166
See application file for complete search history.

(56) References Cited

U.S. PATENT DOCUMENTS 4,662,016 A * 5/1987 Seeman ............... A47C 21/022
                                                          24/72.5
7,020,935 B2 * 4/2006 Behn ........................ A45F 5/00
                                                          24/3.13

10,807,453 B2 10/2020 Brown
11,554,653 B2 1/2023 Brown
2009/0183809 A1 7/2009 Wiegel
2012/0241059 A1 * 9/2012 Wilson ................... A45C 13/08
                                                          150/105
2015/0357105 A1 12/2015 Taylor et al.
2019/0160930 A1 5/2019 Brown
2019/0389294 A1 12/2019 Brown
2024/0349871 A1 * 10/2024 Reid ....................... A45F 3/047

FOREIGN PATENT DOCUMENTS

CN      107962941 A       4/2018
DE          3814044 A1      10/1988
DE      202012010911 U1      3/2013
GB          2598822 A       3/2022
KR        20140027737 A       7/2014
WO        2018042374 A1      3/2018

* cited by examiner

*Primary Examiner* — Don M Anderson
*Assistant Examiner* — Jessica Kavini Tamil
(74) *Attorney, Agent, or Firm* — David Guerra

(57) ABSTRACT

A cover securing device or system for attaching a cover to an anchor. The cover securing system can include a body with a ball member, a connector engageable with the anchor, and a retainer for removably securing the cover with the ball member. The present technology allows for secure attachment to prevent blowoff of the cover during high winds or sever weather, as well as providing a quick and easy mounting and dismounting of the cover to the anchor. The body can be made of two attachable body members that securely fit together to secure a connector strap therebetween. The connector can be associated with the connector strap.

11 Claims, 4 Drawing Sheets

COVER SECURING DEVICE, SYSTEM AND METHOD

BACKGROUND

Technical Field

In some aspects, the present technology can relate to a cover securing device, system and method for use in connection with securing a cover to an anchor device. In some other aspects, the present technology can relate to methods associated with a securing a cover to an anchoring device. In still some other aspects, the present technology can relate to cover securing system including a cover securing device engageable with a vehicle cover and a tire mat.

Background Description

The use of car cover hold-down devices may be known, however these hold-down devices do not allow for the adjustability of a hold-down force and/or portability. Conventional automobile covers may include tie downs to assist in holding the cover on the car. However, these tie downs are difficult to use and do not allow for any adjustability in their holding operations.

It is a common problem that wind can blow off a vehicle cover or partially off, thereby exposing the exterior of the vehicle to the elements. Securing the vehicle cover to the vehicle has been a problem and the subject of several solutions.

Further, cover anchoring devices may be known, however, these devices typically having teeth or other piercing elements that may damage the cover when clamped thereto. Over time, wind and donning of the cover over a vehicle present a fatigue factor to the cover, thereby resulting in ripping and hence failure of the cover.

SUMMARY

In view of the foregoing disadvantages inherent in the known types of cover anchors at least some embodiments of the present technology provides a novel dismountable cover securing device, system and method, and overcomes one or more of the mentioned disadvantages and drawbacks of known cover anchors. As such, the general purpose of at least some embodiments of the present technology, which will be described subsequently in greater detail, is to provide a new and novel cover securing device, system and method which has all the advantages of known cover anchors and many novel features that result in a cover securing device, system and method which is not anticipated, rendered obvious, suggested, or even implied by these known cover anchors, either alone or in any combination thereof.

According to one aspect, the present technology can include a cover securing system for attaching a cover to an anchor. The cover securing system can include a body, a connector and a retainer. The body can include a ball member extending out from the body. The connector can be engageable with the anchor. A portion of the cover can be secured to the ball member by the retainer.

According to another aspect, the present technology can include a cover securing system for attaching a cover to an anchor. The cover securing system can include a body, a connector and a retainer. The body can include a first body member, a second body member, and a ball member extending out from the second body member. The first body member and the second body member can be attachable to each other. The connector can include a connector body attachable between the first body member and the second body member, and a connector member that can be engageable with the anchor. A portion of the cover can be secured to the ball member by the retainer.

According to still another aspect, the present technology can include a cover securing system for attaching a cover to an anchor. The cover securing system can include an anchor and a cover securing device. The cover securing device can include a body, a connector strap and a retainer. The body can include a neck extending out from the body, and a ball member extending from the neck. The connector strap can be attachable to the body, and the connector strap can include a connector that can be engageable with the anchor. A portion of the cover can be secured to the neck by the retainer.

According to yet another aspect, the present technology can include a method of using a cover securing system for attaching a cover to an anchor. The cover securing system can include a body, a connector and a retainer. The body can include a ball member extending out from the body. The connector can be engageable with the anchor. A portion of the cover can be secured to the ball member by the retainer. The method can include the steps of placing a portion of the cover over the ball member. Placing the retainer over the portion of the cover and tightening the retainer to secure the portion of the cover to with the ball member.

Some or any embodiments of the present technology can include a connector strap connecting the connector with the body.

In some or any embodiments, the body can include a first body member and a second body member. The first body member and the second body member can be attachable to each other.

In some or any embodiments, any one of or any combination of the first body member and the second body member can be configured to secure at least a portion of the connector strap between the first body member and the second body member when assembled.

In some or any embodiments, the first body member and the second body member can each include an exterior side and an interior side. The interior side of the first body member and the second body member can face each other when assembled.

In some or any embodiments, any one of or any combination of the first body member and the second body member can include a notch defined in the interior side thereof, respectively. The notch can be configured to receive the portion of the connector strap.

In some or any embodiments, the first body member can include one or more studs extending out from the interior side of the first body member.

In some or any embodiments, the second body member can include one or more snaps extending out from the interior side of the second body member. The snaps can be engageable with the studs.

In some or any embodiments, the portion of the connector strap can include one or more bores defined therethrough. The bores can be configured to receive the snaps therethrough.

In some or any embodiments, the second body member can include a neck connecting the exterior side of the second body member and the ball member.

In some or any embodiments, the connector strap can include a connector end including the connector.

Some or any embodiments of the present technology can include a second connector attachable to or extending from the connector end. The connector can be a male or female connector, and the second connector can be different to the connector.

In some or any embodiments, the body can include a neck between the body and the ball member.

In some or any embodiments, the neck has a width or diameter less than a width or diameter of the ball member.

In some or any embodiments, the retainer can be configured to secure the portion of the cover to the neck.

Some or any embodiments of the present technology can include an additional strap connecting the body to a body of a second cover securing system.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel cover securing device, system and method that has all of the advantages of known cover anchors and none of the disadvantages.

It is another object of the present technology to provide a new and novel cover securing device, system and method that may be easily and efficiently manufactured and marketed.

An even further object of the present technology is to provide a new and novel cover securing device, system and method that has a low cost of manufacture with regard to both materials and labor, and which accordingly is then susceptible of low prices of sale to the consuming public, thereby making such cover securing device, system and method economically available to the buying public.

Still another object of the present technology is to provide a new cover securing device, system and method that provides in the apparatuses and methods of known cover anchors some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof, with phantom lines (long-short-short-long lines) depicting environmental structure and forming no part of the claimed present technology. Such description makes reference to the annexed drawings wherein:

The same reference numerals refer to the same parts throughout the various figures.

DETAILED DESCRIPTION OF THE EMBODIMENTS

Figure 1:
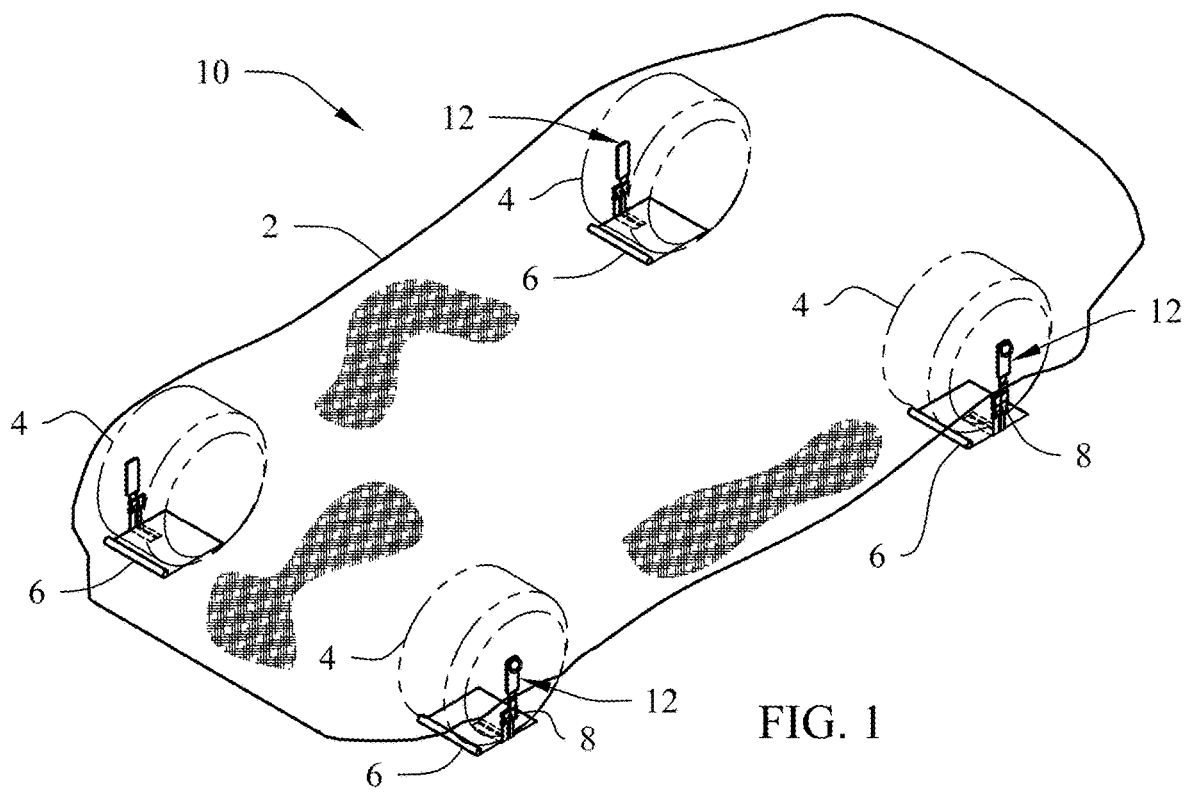
FIG. 1 is perspective view of an embodiment of the cover securing device and system constructed in accordance with the principles of the present technology, with the phantom lines depicting environmental structure and forming no part of the claimed present technology.

Apart from the cumbersomeness of known cover anchors and/or cover connector systems, the present technology provides an easy to use cover securing system that does not damage the vehicle being covered nor the cover, while releasably connecting to a cover anchor device such as a tire mat or any other anchor.

While the above-described devices fulfill their respective particular objectives and requirements, the aforementioned devices or systems do not describe a cover securing device, system and method that allows removably securing a cover to an anchoring device without damaging the cover. The present technology additionally overcomes one or more of the disadvantages associated with known cover anchors.

A need exists for a new and novel cover securing device, system and method that can be used for securing a cover to an anchor device. In this regard, the present technology substantially fulfills this need. In this respect, the cover securing device, system and method according to the present technology substantially departs from the conventional concepts and designs of known cover anchors, and in doing so provides an apparatus primarily developed for the purpose of securing a cover to an anchoring device.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-10, an embodiment of the cover securing device, system and method of the present technology is shown and generally designated by the reference numeral 10.

In the exemplary, the present technology will be described for utilization with an automobile, but it can be appreciated that the present technology can be used with other vehicles such as, but not limited to, motorcycles, quads, three-wheeled vehicles, campers, trailers, boats and the like, and with an object in the need for being covered by a cover.

In FIG. 1, a new and novel cover securing device or system 10 of the present technology for securing a cover to an anchoring is illustrated and will be described. More particularly, the cover securing system 10 can include a cover securing device 12 that is connectable with an anchor 6 for securing a cover 2 over an object such as, but not limited to, a vehicle 4.

The cover securing system 10 can include a body 14 including a ball member 42 extending out from the body 14, a retainer 62, and a connector 56, 58 engageable with the anchor 6. A first portion 2a of the cover 2 can be secured to the ball member 42 by the retainer 62.

In one embodiment, the present technology can include a cover securing system 10 including the cover securing device 12 and the cover anchor 6.

Figure 2:
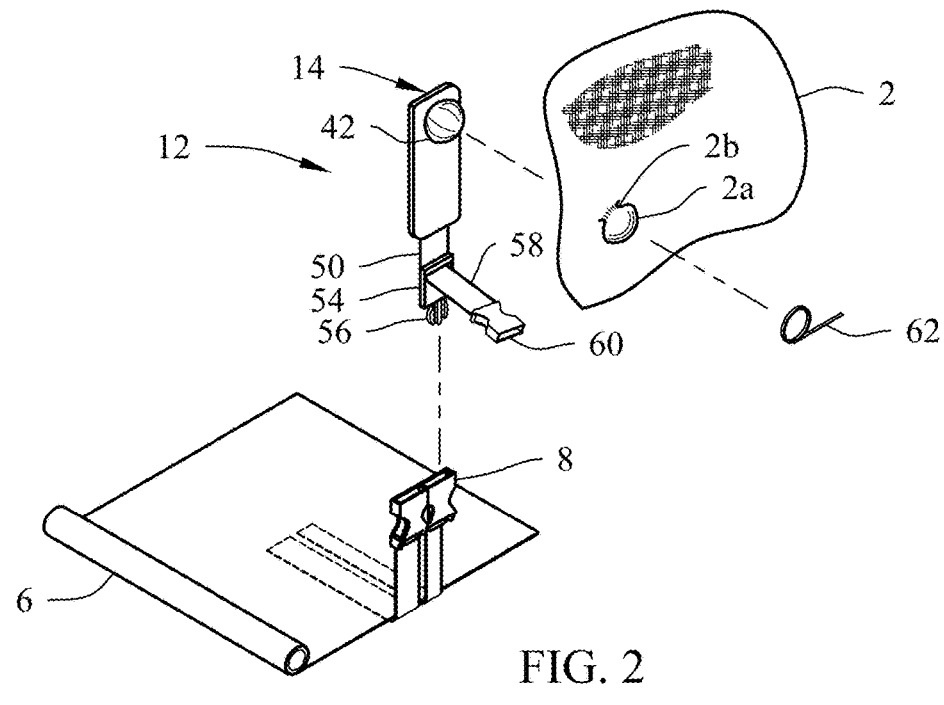
FIG. 2 is an exploded perspective view of the cover securing device utilized with a left side of the vehicle, with a right side cover securing device being a mirror image thereof.

In the exemplary, the anchor 6 can be any body capable of holding down the cover 2. For example, but not limited to, a weighted object, a stake, a clip, clamp or hook attachable to an object, a tire mat or the like. In the exemplary, the anchor is presently described as a tire mat 6 that can include a pair of right side mats configured to be utilizable with the right (passenger) side tires of the vehicle 4 and a pair of left side mats configured to be utilizable with the left (driver) side tires of the vehicle. Referring to FIG. 2, a driver side tire mat 6 is illustrated and described, where it can be appreciated that the passenger side tire mat 6 includes the same structural elements but mirrored to that of the driver side mat.

Further in the exemplary, the tire mats 6 can each include a mat body featuring a top side and a bottom side, a tire stop, and a mat connector member 8. The mat body can have any geometric configuration capable of being placed on the ground or floor, while allowing a tire of the vehicle 4 to be placed thereon. The mat body can be made from any durable material that can withstand environmental elements, and wear and tear from the vehicle driving and/or placed thereon. In the exemplary, such materials can be, but not limited to, rubber, vinyl, plastic, metal and the like.

The mat connector member 8 can be one connector member, a pair of connector members or multiple connector members adjacent to each other in a side by side configuration. In one embodiment, the present technology can utilize a single mat connector member 8 or multiple mat connector members placing in spaced apart relationship from the mat body.

The mat connect member 8 can include a mat connector strap with a section secured to the mat body and a free section extending outwardly therefrom. The section can be secured to either the top side or the bottom side of the mat body by any suitable means such as, but not limited to, stitching, adhesives, mechanical fasteners, hook and loop fasteners, snaps and the like.

The free section of the mat connector strap can be securing to a mat connector piece such as, but not limited to, a female connector or male connector.

Referring to FIGS. 3-6, the body 14 can have an elongated rectangular shape, and can be made from any suitable soft and flexible material such as, but not limited to, silicon, rubber, plastic, Low-density Polyethene (LDPE), High-density Polyethene (HDPE), Polypropylene (PP), composites, or the like. The use of soft material for the body 14 is beneficial to not scratch, damage or mar the portion of the object or vehicle 4 adjacent to the body 14. As the body 14 will be between the vehicle 4 and the cover 2, then any movement of the cover 2 due to wind, rain, hail, animals, people or contact with an objection could result in the body 14 contacting the vehicle 4.

In one embodiment, the body 14 and the connector 56, 58 can be formed as an integral body.

In one embodiment, the body 14 can include a first body member 16 and a second body member 30, with the first and second body members 16, 30 be attachable to each other in operative engagement with a connector band or strap 50. In one embodiment, the first and second body members 16, 30 can each be injection molded.

The first body member 16 can include an exterior side 18 and an interior side 20, with a notch 22 defined in the interior side 20 along a portion of a longitudinal length of the first body member 16. The notch 22 can be defined through one end of the first body member 16 to create an opened end. It can be appreciated that the notch 22 can be defined along the entire longitudinal length of the interior side 20, thereby allowing the first body member 16 to be invertible for use and assembly.

Figures 3, 4, 5, 6:
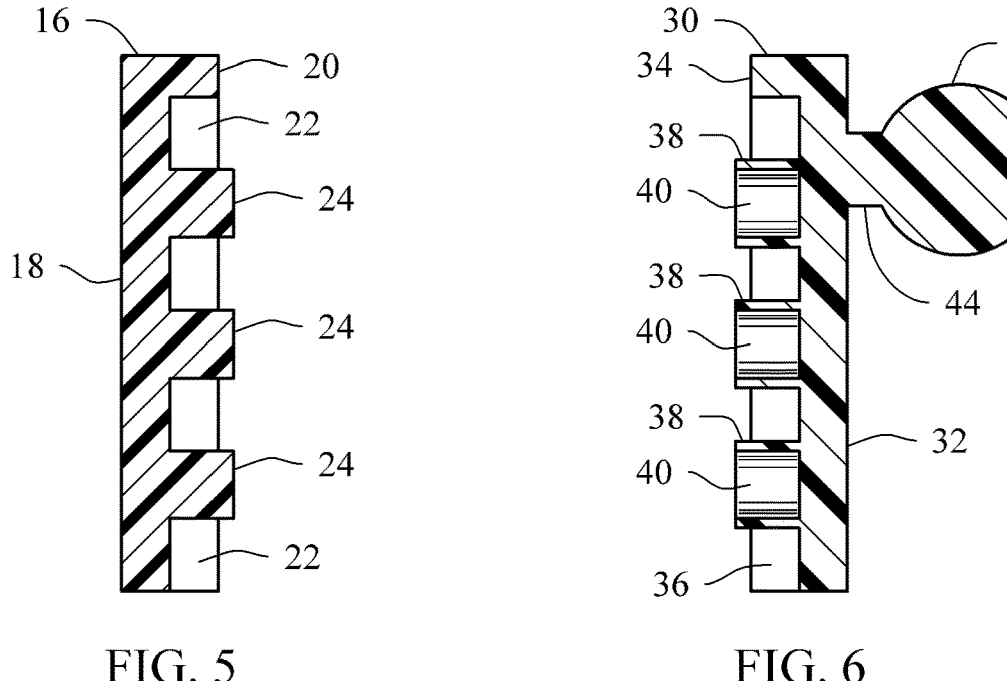
FIG. 3 is an exploded perspective view of the cover securing device.
FIG. 4 is a rear perspective view of the rear side of the second body member showing the receiving snaps.
FIG. 5 is a cross-sectional view of the first body member taken along line 5-5 in FIG. 3.
FIG. 6 is a cross-sectional view of the second body member taken along line 6-6 in FIG. 3.

One or more studs 24 can extend out from a surface of the interior side 20 that defines the notch 22, and project into the notch 22. The studs 24 can terminate within the notch 22 or can extend out past the interior side 20, as best illustrated in FIG. 5.

The second body member 30 can include an exterior side 32 and an interior side 34, with a notch 36 defined in the interior side 34 along a portion of a longitudinal length of the second body member 30. The notch 36 can be defined through one end of the second body member 30 to create an opened end. It can be appreciated that the notch 36 can be defined along the entire longitudinal length of the interior side 34, thereby allowing the second body member 30 to be invertible for use and assembly.

One or more studs snaps 38 can extend out from a surface of the interior side 34 that defines the notch 36, and project into the notch 36. The snaps 38 can terminate within the notch 36 or can extend out past the interior side 34, as best illustrated in FIG. 6. Each of the snaps 38 can have a diameter or width greater than a width or diameter of the studs 24. Further, each of the snaps 38 can include a recess 40 configured to receive one of the studs 24. The width or diameter of the recess 40 can be configured to securely and fixedly receive the stud 24 in manner that permanently or removably secures the first and second body members 16, 30 together when assembled or allows for the first and second body members 16, 30 to be separated upon a sufficient separation force applied to any one of or any combination of the first body member 16 and the second body member 30.

In one embodiment, the studs 24 can be a latch or hook that engages or ratchets with a ledge (not shown) extending into the recess 40.

In one embodiment, the studs 24 and the snaps 36 can be omitted from the first and second body members 16, 30, and a fastener (not shown) can be utilized to secure the first and second body members 16, 30 together.

The ball member 42 can extend or protrude from the exterior side 32 of the second body member 30 by way of a neck 44. In the exemplary, the ball member 42 can have a configuration such as, but not limited to, a spherical, oval, elliptical or geometric profile.

In one embodiment, the ball member 42 can be attachable to the second body member 30 by way of a fastener (not shown). In another embodiment, the ball member 42 and the neck 44 can be integrally formed, with the neck 44 being attachable to the second body member 30.

In one embodiment, multiple ball members 42 can be associated with any one of or any combination of the first body member 16 and the second body member 30.

The neck 44 can have a width or diameter less than a width or diameter of the ball member 42, thereby creating a narrowed section between the exterior side 32 and the ball member 42. A length, width or diameter of the neck 44 can be sized to create a gap between the exterior side 32 of the second body member 30 and a surface of the ball member 42. The gap, as defined by the neck 44, can be configured to receive a second portion 2b of the cover 2 in combination with the retainer 62, as best illustrated in the enlarged section of FIG. 7.

When the first and second body members 16, 30 are assembled so that the open end of the interior side 20 of the first body member 16 and the open end of the interior side 34 of the second body member 30 are in juxtaposition to define a single opening in one end of the body 14.

In one embodiment, only one notch can be utilized in either the first body member 16 or the second body member 30.

Referring to FIG. 3, the connector strap 50 can include an elongated strap body 52 featuring one or more bores 53 defined therethrough, and a connector end 54 including a first connector member 56. The connector strap 50 can be made from any suitable material such as, but not limited to, nylon, plastic, metal, aluminum, alloys, composites or the like.

Figures 7, 8:
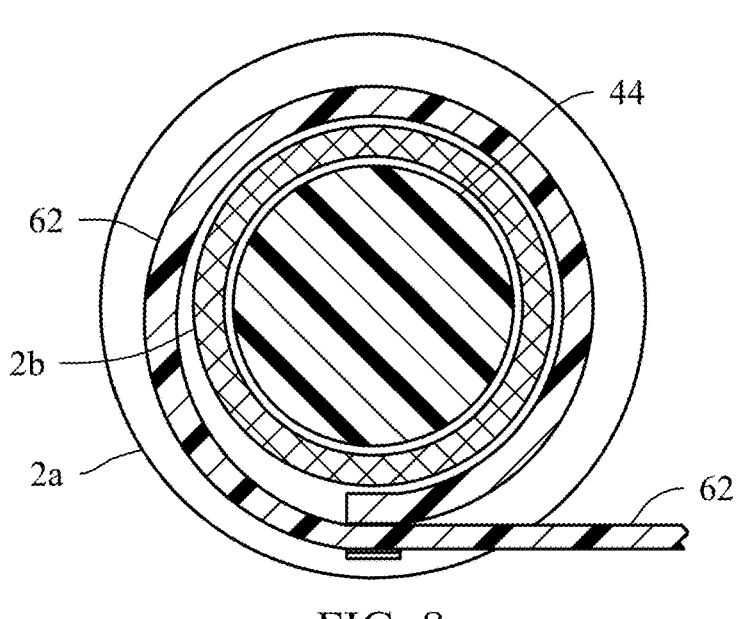
FIG. 7 is a cross-sectional view of the cover securing device assembled and in use with the vehicle cover.
FIG. 8 is a cross-sectional view of the tie wrap securing the vehicle cover around the neck of the ball member of the cover securing device.

The strap body 52 has a width configured for reception in the notch 22 of the first body member 16 and/or the notch 36 of the second body member 30. When assembled, the strap body 52 is received in the notches 22, 36 so that the snaps 38 pass through the bores 53, as best illustrated in FIG. 7.

The bores 53 can have a width or diameter suitable for the snaps 38 to pass therethrough, thereby aligning and securing the strap body 52 in the notch 36 of the second body member 30.

The connector end 54 can be associated with or extend from an end of the strap body 52. A configuration of the first connector member 56 can be to engage with the anchor connect member 8. In one embodiment, the first connector member 56 can be a male connector member with the mat connect member 8 being a female connector member, or vice versa.

In one embodiment, the body 14 can be omitted and the ball member 42 and the neck 44 can be integrally formed or attachable to the strap body 52 including or omitting the bores 53.

In one embodiment, the body 14 and the strap body 52 can be omitted and the ball member 42 and neck 44 can be integrally formed or attachable to the connector end 54.

A second connector strap 56 can extend from or be attachable to the connector end 54 in a fixed or adjustable length configuration. A second connector member 60 can be associated with an end of the second connector strap 56. The second connector member 60 can be a male or female connector member that is opposite to that of the first connector member 56. Utilizing different types of male and female connector members for the first and second connector members 56, 60 allows for the cover securing device 12 to be attached to different connector type associated with the cover anchor 6.

Figure 9:
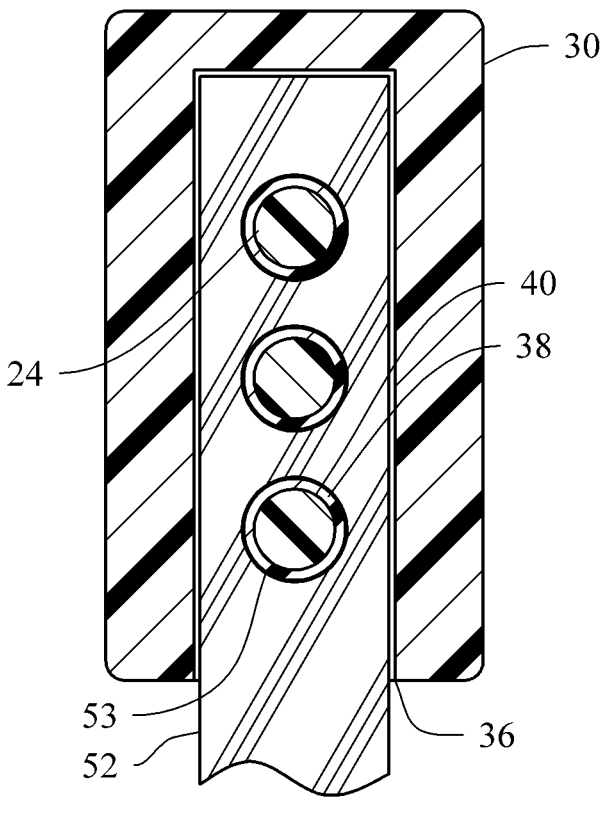
FIG. 9 is a cross-sectional view of the second body member, the snaps, the studs and the connector body taken along line 9-9 in FIG. 7.

Referring to FIGS. 7-9, the first portion 2a of the vehicle cover 2 can surround the ball member 42 so that the second portion 2b can be clamped, pinched, cinched or otherwise secured to the neck 44 by use of the retainer 62. The retainer 62 can be utilized to wrap around the neck 42 and then tighten or reduced in size to secure the second portion 2b of the vehicle cover 2 to the neck 44. In the exemplary, the retainer 62 can be, but not limited to, a tie wrap, a zip-tie, a clamping band, a clamping strap, a pipe clamp, an elastic band, corresponding magnetic elements, or any fastening device capable of reducing its size.

In the tightened or reduced sized configuration, the retainer 62 accordingly secures the second portion 2b to the neck 44, and since the ball member 42 has a size greater than the neck 44, then consequently the cover 2 is prevented from being pulled off the ball member 42.

Figure 10:
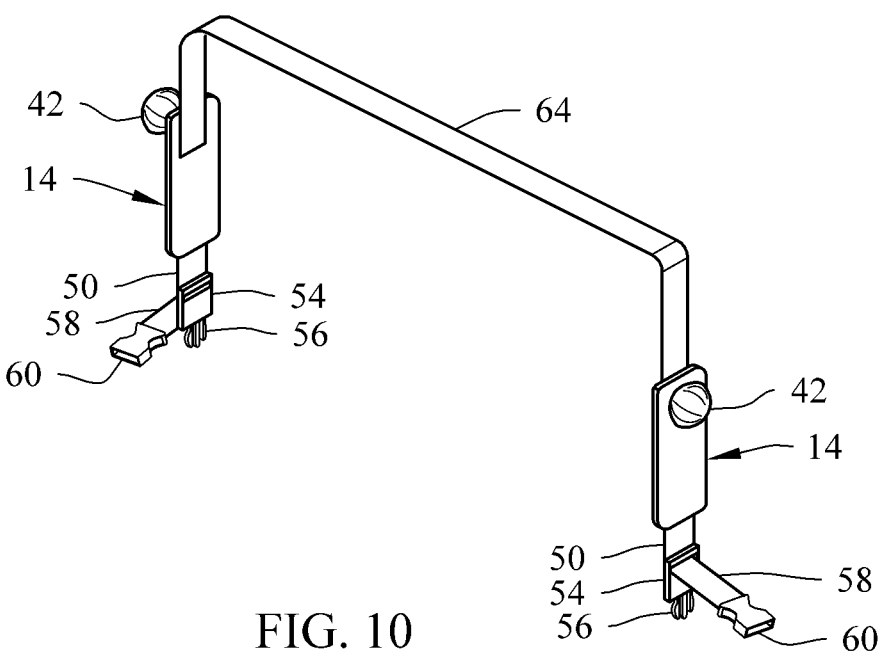
FIG. 10 is a perspective view of the additional strap connecting a pair of cover securing devices.

Referring to FIG. 10, an additional strap 64 can connect two or more cover securing devices 12 together. A first end of the additional strap 64 can be integrally formed or attachable to the body 14 of a first cover securing device 12, and a second end of the additional strap 64 can be integrally formed or attachable to the body 14 of a second cover securing device 12. In an exemplary use, the additional strap 64 can be positioned under or over the cover 2.

In one embodiment, the additional strap 64 can be integrally formed or attachable to any part of the connector 50.

The present technology can include a hand held rectangular soft cased device 12 with a semi-soft ball 42 at one end as well as tow side 16, 30 release safety snaps 24, 38 extending beyond the opposite end of the device 12. The main purpose of this is to place underneath a cover 2 of pliable material used to cover and protect an object underneath. Because attachment is usually harmful to that very same material used, after manufactured, this device 12 easily replaces other attachments by allowing the pliable material 2a to be wrapped gently around the soft ball 42 and secured with a general purpose tie wrap or zip-tie 62 between the ball 42 and the cover material 2b. This unique design allows for secure attachment as well as a quick and easy procedure. By having two safety snaps or connectors 56, 60 at the ends, it will permit nylon safety cords/straps 50 to be placed in two different directions providing superior blowoff protection of the cover 2 from high winds and sever rainstorms, which would be harmful to whatever object is underneath the cover.

The present technology can be designed with a body case cover 14 made from soft silicone-like material, which encases an internal functioning aluminum or nylon strengthening plate 50 and side safety snap or snaps at an exposed end to attach to a chain of safety snaps and nylon straps used for whole vehicle attachment covering protection. The present technology can be a flexible device to allow for securing attachment to a vehicle cover 2 or other covering article for wind blowoff protection using strong nylon straps either under or over a vehicle without potential paint damage to the body of the vehicle or other item underneath the cover or tarp.

One purpose of the device is to make the attachment of a safety snap apparatus system for vehicle covers 2 or other items covered under soft material used for protection. This allows for a simple, handy, useful and harmless protection. This assembled one piece design incorporates an internal, flexible strengthening piece of aluminum or nylon 50 secured with internal pegs/studs 24, 38 able of providing the necessary pull back to prevent dislodgement when excessive winds are tugging on the cover 2 to cause release. Because it is held in its position with studs 24, 38 internally across multiple holes 53 along its length, this design will provide this functionality to the whole concept. Using safety side release connectors 56, 60 at the end of the strengthening plate 50 provides multiple uses in the manner in which this one piece is able to connect to the chain of attachments beyond.

At the opposite end of the device protrudes a slightly soft round ball-like objection 42 central to the usefulness of attachment to any material used for covering objects, such as an automobile. The ball 42 is used to provide the space for the covering material 2a to wrap around it. There can be a small space 44 about the width of a tie wrap or zip-tie 62 between the ball 42 and the case material 30. This space 44 is there to allow the tie wrap or zip-tie 62 to be able to be securely placed to afford strength to prevent dislodgement of the cover 2 under pressure. Because of this design, it allows the user to quickly apply this all in one device 12 to attach to other nylon straps for wrapping either over or under the vehicle for complete securing in preventing winds or heavy rain from pulling off the cover 2. This design can also allow the ends of the vehicle (front and rear) to be attached to the chain attachments.

By using several "Y" shaped snaps or connectors 56, 60 to provide other avenues of use to other areas, this device and any accessories can give options not available by other products in use. The nylon straps can continue the strong chain of protection and prevention of dislodgement.

In use and method thereof, it can now be understood that the cover securing device 12 can be used to secure the cover 2, such as a vehicle cover, to the cover anchor 6. The first portion 2a of the cover 2 can be wrapped or placed over the ball member 42 so that the second portion 2b is adjacent the neck 44. The retainer 62 can then be placed around the second portion 2b and tightened so that the second portion 2b is brought towards and secured against the neck 44, thereby securing the cover 2 to the cover securing device 12. It can be appreciated that multiple cover securing devices 12 can be utilized and secured to different locations on the cover 2.

After which, the cover securing device 12 can be attached to the anchor 6 for holding down the cover 2 and preventing the cover 2 from be blown off during high winds or sever weather. Any one of the connector members 56, 60 can be engaged with a corresponding connector member 8 of the anchor 6 allowing for removable securement of the cover securing device 12 to the anchor 6.

If positional adjustment of the cover 2 is wanted, then the retainer 62 can be loosened or removed allowing for slack between the ball member 42 and the first and second portions 2a, 2b to be formed. The cover 2 can then be repositioned in relation to the ball member 42, and the retainer 62 tightened. This can allow for the cover 2 to have a looser or tighter fit against the object 4 being covered.

According to one aspect, the present technology can include a cover securing system 12 for attaching a cover 2 to an anchor 6. The cover securing system can include a body 14, a connector 56 and a retainer 62. The body 14 can include a ball member 42 extending out from the body 14. The connector 56 can be engageable with the anchor 6. A portion 2a, 2b of the cover 2 can be secured to the ball member 42 by the retainer 62.

According to another aspect, the present technology can include a cover securing system 12 for attaching a cover 2 to an anchor 6. The cover securing system 12 can include a body 14, a connector 50 and a restrainer 62. The body 14 can include a first body member 16, a second body member 30, a neck 44 extending out from the second body member 16, and a ball member 42 extending from the neck 44. The first body member 16 and the second body member 30 can be attachable to each other. The connector 50 can include a connector body 52 attachable between the first body member 14 and the second body member 30, and a connector member 56, 60 engageable with the anchor 6. Wherein a portion of the cover 2a, 2b can be secured to the neck 44 by the retainer 62.

According to yet another aspect, the present technology can include a cover securing system 10 for attaching a cover 2 to an anchor 6. The cover securing system 10 can include an anchor 6 and a cover securing device 12. The cover securing device 12 can include a body 14, a connector strap 50 and a retainer 62. The body 14 can include a neck 44 extending out from the body 14, and a ball member 42 extending from the neck 44. The connector strap 50 can be attachable to the body 14, and the connector strap 50 can include a connector 56 that can be engageable with the anchor 6. A portion 2a, 2b of the cover 2 can be secured to the neck 44 by the retainer 62.

According to still yet another aspect, the present technology can include a method of using a cover securing system 12 for attaching a cover 2 to an anchor 6. The cover securing system 12 can include a body 14, a connector 56 and a retainer 62. The body 14 can include a ball member 42 extending out from the body 14. The connector 56 can be engageable with the anchor 6. The method can include the steps of placing a portion 2a, 2b of the cover 2 over the ball member 42. Placing the retainer 62 over the portion 2a, 2b of the cover 2 and tightening the retainer 62 to secure the portion 2a, 2b of the cover 2 with the ball member 42.

Some or any embodiments of the present technology can include a connector strap 50 connecting the connector 56 with the body 14.

In some or any embodiments, the body 14 can include a first body member 16 and a second body member 30. The first body member 16 and the second body member 30 can be attachable to each other.

In some or any embodiments, any one of or any combination of the first body member 16 and the second body member 30 can be configured to secure at least a portion 52 of the connector strap 50 between the first body member 16 and the second body member 30 when assembled.

In some or any embodiments, the first body member 16 and the second body member 30 can each include an exterior side 18, 32 and an interior side 20, 34. The interior side 20, 34 of the first body member 16 and the second body member 30 can face each other when assembled.

In some or any embodiments, any one of or any combination of the first body member 16 and the second body member 30 can include a notch 22, 36 defined in the interior side t20, 34 hereof, respectively. The notch 22, 36 can be configured to receive the portion 52 of the connector strap 50.

In some or any embodiments, the first body member 16 can include one or more studs 24 extending out from the interior side 20 of the first body member.

In some or any embodiments, the second body member 30 can include one or more snaps 38 extending out from the interior side 36 of the second body member. The snaps 38 can be engageable with the studs 24.

In some or any embodiments, the portion 52 of the connector strap 50 can include one or more bores 53 defined therethrough. The bores 53 can be configured to receive the snaps 38 therethrough.

In some or any embodiments, the second body member 30 can include a neck 44 connecting the exterior side 32 of the second body member 30 and the ball member 42.

In some or any embodiments, the connector strap 50 can include a connector end 54 including the connector 56.

Some or any embodiments of the present technology can include a second connector 60 attachable to or extending from the connector end 54. The connector 56 can be a male or female connector, and the second connector 60 can be different to the connector.

In some or any embodiments, the body 14 can include a neck 44 between the body 14 and the ball member 42.

In some or any embodiments, the neck 44 has a width or diameter less than a width or diameter of the ball member 42.

In some or any embodiments, the retainer 62 can be configured to secure the portion 2a, 2b of the cover 2 to the neck 44.

Some or any embodiments of the present technology can include an additional strap 64 connecting the body 14 to a body 14 of a second cover securing system 12.

Some or any embodiments of the present technology can include an anchor 6.

While embodiments of the cover securing device, system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although securing a cover to an anchoring device have been described, it should be appreciated that the cover securing device, system and method herein described is also suitable for securing any flexible sheet to any anchor-like device.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

That is claimed as being new and desired to be protected by Letters Patent of the United States is as follows:

1. A cover securing system for attaching a cover to an anchor for covering a vehicle body, the cover securing system comprising:
   a body made of a soft and flexible material that prevents damage to the vehicle body when in use, the body comprising:

a first body member including an exterior side, an interior side, and one or more studs extending out from the interior side of the first body member;
   a second body member including an exterior side, an interior side, and one or more snaps extending out from the interior side of the second body member, the snaps being engageable with the studs; and
   a ball member extending out from the body, the ball member is made of the soft and flexible material;
   wherein the first body member and the second body member being attachable to each other;
a connector engageable with the anchor;
a retainer, wherein a portion of the cover when placed over the ball member is secured to the ball member by the retainer; and
a connector strap connecting the connector with the body;
wherein any one of or any combination of the first body member and the second body member is configured to secure at least a portion of the connector strap between the first body member and the second body member when assembled;
wherein any one of or any combination of the first body member and the second body member includes a notch defined in the interior side thereof, respectively, the notch being configured to receive the portion of the connector strap;
wherein the portion of the connector strap includes one or more bores defined therethrough, the bores being configured to receive the snaps therethrough.

2. The cover securing system according to claim 1, wherein the second body member includes a neck connecting the exterior side of the second body member and the ball member.

3. The cover securing system according to claim 2, wherein the neck has a width or diameter less than a width or diameter of the ball member.

4. The cover securing system according to claim 2, wherein the retainer is configured to secure the portion of the cover to the neck.

5. The cover securing system according to claim 1, wherein the connector strap includes a connector end including the connector.

6. The cover securing system according to claim 5 further comprising a second connector extendable or attachable to the connector end, wherein the connector is a male or female connector, and the second connector is different to the connector.

7. The cover securing system according to claim 1, wherein the body includes a neck between the body and the ball member.

8. The cover securing system according to claim 7, wherein the neck has a width or diameter less than a width or diameter of the ball member.

9. The cover securing system according to claim 7, wherein the retainer is configured to secure the portion of the cover to the neck.

10. A cover securing system for attaching a cover to an anchor, the cover securing system comprising:
    a body made of a soft and flexible material that prevents damage to a vehicle body when in use, the body comprising:
    a first body member including an exterior side, an interior side, and one or more studs extending out from the interior side of the first body member;
    a second body member including an exterior side, an interior side, and one or more snaps extending out from the interior side of the second body member, the snaps being engageable with the studs;

a neck extending out from the second body member; and a ball member extending from the neck, the ball member is made of the soft and flexible material;

wherein the first body member and the second body member being attachable to each other;

a connector including a connector body attachable between the first body member and the second body member, and a connector member engageable with the anchor;

a retainer, wherein a portion of the cover when placed over the ball member is secured to the neck by the retainer; and a connector strap connecting the connector with the body;

wherein any one of or any combination of the first body member and the second body member is configured to secure at least a portion of the connector strap between the first body member and the second body member when assembled;

wherein any one of or any combination of the first body member and the second body member includes a notch defined in the interior side thereof, respectively, the notch being configured to receive the portion of the connector strap;

wherein the portion of the connector strap includes one or more bores defined therethrough, the bores being configured to receive the snaps therethrough.

11. The cover securing system according to claim 10, wherein the connector includes a connector end including the connector member, and wherein the cover securing system further comprises a second connector member attachable to or extending from the connector end, and wherein the connector member is a male or female connector member, and the second connector member is different to the connector member.

* * * * *